United States Patent
Higuera

[15] 3,658,096
[45] Apr. 25, 1972

[54] INSULATING PLUG

[72] Inventor: Robert E. Higuera, Lafayette, Calif.
[73] Assignee: San Roy Development Co., Inc., San Rafael, Calif.
[22] Filed: July 17, 1970
[21] Appl. No.: 55,718

[52] U.S. Cl. .............................. 138/90, 220/24 H, 220/55 K
[51] Int. Cl. .......................................................... F16l 55/10
[58] Field of Search ............... 138/89, 90, 92, 94.3, 94, 94.5, 138/95, 96, 149, 91; 220/55 K, 57, 24 H

[56] References Cited

UNITED STATES PATENTS 1,837,346  12/1931  Thomas et al. ........................... 138/89

Primary Examiner—Houston S. Bell, Jr.
Attorney—Fryer, Tjensvold, Feix, Phillips & Lempio

[57] ABSTRACT

A demountable insulating plug formed of a "biscuit" of selected insulating material and desired shape, is secured at one flat surface thereof to a cap of substantially larger peripheral dimensions, and formed of a preferably metallic material having good heat dissipating properties, such as aluminum. A handle, formed of a strip of resilient metal and pointed at either end, is extendably disposed with an arcuate configuration through diametrically opposed slots in the cap. Lock tabs are formed in the cap. Lock tabs are also formed in the extended portion of the handle which engage the lock tabs of the cap to prevent withdrawing the handle from the cap. To install, the handle is pulled away from the cap to retract the end portions, and the plug is placed in position in the hole in the insulation of a preinsulated pipe which is to be plugged. Natural resiliency of the material and pressure applied against the handle tend to straighten the latter, which drives the pointed ends thereof radially outwardly into the surrounding insulating material. The resiliency of the handle tends to maintain the pointed ends into the insulation, whereby the plug is securely held in position.

9 Claims, 3 Drawing Figures

PATENTED APR 25 1972　　　　　　　　　　　　　　　　3,658,096
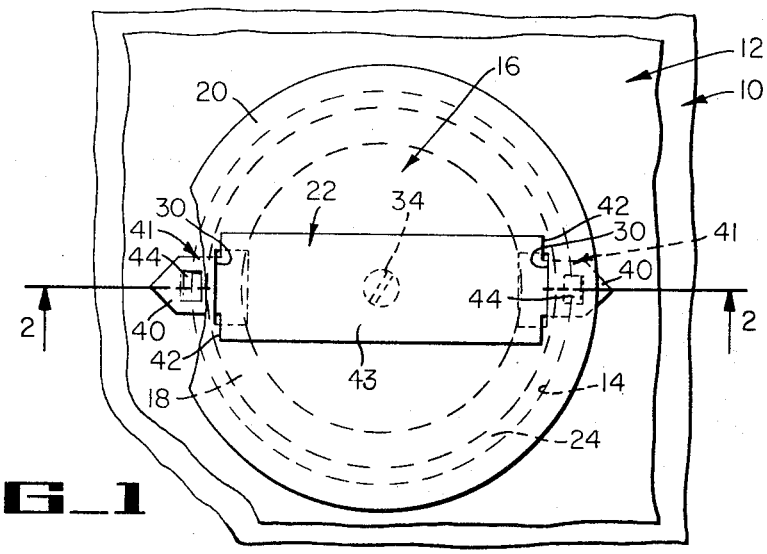
FIG_1
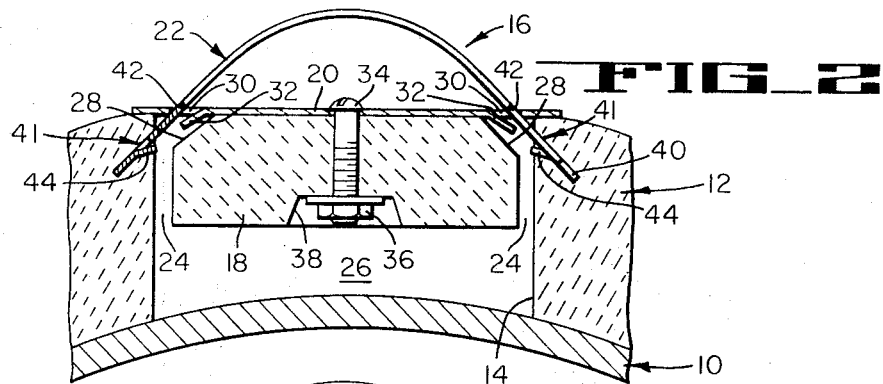
FIG_2
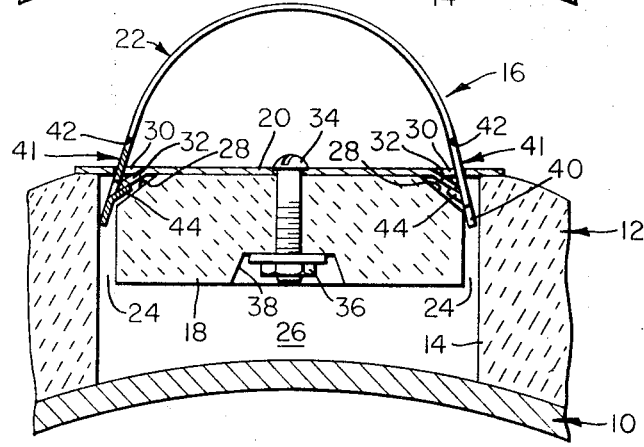
FIG_3
INVENTOR.
ROBERT E. HIGUERA
BY
ATTORNEYS

INSULATING PLUG

BACKGROUND OF THE INVENTION

The invention relates to a readily removable, and thus reusable, insulating plug for replugging holes cut into insulation disposed around the various pipes, tanks, etc., of cryogenic or high temperature systems such as are employed, for example, in refineries, chemical manufacturing or processing plants, and the like.

BACKGROUND OF THE INVENTION AND PRIOR ART

In cryogenic, high temperature, etc., systems such as employed in refineries and chemical processing plants, various pipe, tank, and other members are required to efficiently transport very cold (cryogenic temperatures) or very hot (for instance, 1,400° F.) fluids, which may also be caustic or corrosive in nature. Accordingly the pipes, tanks, and other members, are covered with various types and configurations of insulating material; e.g., preformed lengths of insulation defining half cylinders which are clamped together about the pipes; premolded insulation formed directly on the pipes; strips of insulation wrapped around the pipes; etc. To prevent pipe failure in such systems, it is desirable and necessary to periodically check the erosive effects of the fluids in the pipe.

One of the preferred procedures is to employ an ultrasonic test device which provides means for nondestructively detecting the thickness of the pipe wall in place, to thus provide an indication of the condition of the pipe. However, as generally known in the art, such ultrasonic test devices employ ultrasonic transducers which must be held or otherwise secured immediately against the metal of the pipe wall. Thus a plug of the insulating material must be removed from the insulation disposed about the pipe, at specified points therealong where tests are to be made. After the tests are made and the transducer is removed from against the pipe, it is desirable to replug the hole in the insulation to block heat loss or gain to protect personnel from being burned by accidental contact against the exposed pipe, etc. Obviously the plug of insulation originally removed from the insulated pipe cannot be reinserted into the hole since it would not stay in place. Further the plug of insulation is not readily adaptable with some mechanism which would hold it in place.

Various other demountable insulating plug configurations have been tried, however, none are presently available which provide all the following required parameters: The plug should be operable using only one hand; it must insulate as well or nearly as well as the permanent surrounding insulation; it must be sufficiently insulated to prevent personnel burns if deliberately touched or brushed against by accident; it must be reasonably economical to market and/or fabricate; it should not fall out of position if it is jarred or brushed against, or if it is subject to vibration; and it should be reusable for economic reasons.

SUMMARY OF THE INVENTION

The present invention provides a preferred insulating plug configuration which meets all the aforementioned requirements. A plug or "biscuit" of insulating material having a size and shape slightly smaller than the size and shape of the hole formed in the pipe insulation, is secured as by means of a bolt, screw, adhesives, etc., to a slightly larger dimensioned cap of a heat dissipating material, such as aluminum. A handle, formed of a flat, resilient, strip of poor heat conducting material such as, for example, stainless steel, is disposed through a pair of slots in the cap. The end portions of the handle protrude through the slots and extend generally radially outward from the "biscuit" circumference. The ends of the handle are pointed and extend into the surrounding pipe insulation to firmly secure the plug thereto. The resiliency of the handle holds the pointed ends, in the extend position and locked into the surrounding insulation.

In use, the arcuate handle is pinched and simultaneously pulled away from the cap with the fingers of one hand, which action tends to further arch the handle, causing the pointed ends thereof to lie substantially against the circumference of the biscuit. With the pointed ends in such a retracted position, the plug may be inserted into or withdrawn from, the hole in the pipe insulation. When installing, a slight pressure against the arch of the handle and the natural resiliency thereof tends to straighten the handle, whereby the pointed ends are driven into the pipe insulation surrounding the plug. Detents or lock tabs integrally formed as part of the slots during the process of fabricating the cap oppose matching lock tabs formed in the pointed ends of the handle, whereby locking action between respective lock tabs prevents accidentally withdrawing the handle from the cap.

BRIEF DESCRIPTION OF THE DRAWING

FIG. 1 is a plan of an embodiment of the invention, assembled and installed in position within a hole in the insulation of an insulated wall member.

FIG. 2 is a cross section taken along section line 2—2 of FIG. 1, showing the fastening action of the handle when the invention is in position, wherein one end of the handle is cross sectioned to show the lock tab therein.

FIG. 3 is a cross section similar to that of FIG. 2, showing the invention when the handle is retracted, as when installing or removing the plug into or from a hole in the wall member insulation.

DESCRIPTION OF THE PREFERRED EMBODIMENTS

Referring to the drawing, there is shown a portion of a wall member 10 such as a pipe or tank, or other similar member for carrying or containing very high or very low temperature fluids, etc., which member 10 is accordingly provided with an insulating material 12 having properties commensurate with the particular use of the member 10. Thus the insulating material 12 may be any of the various refractory materials such as magnesium carbonate, fire brick, etc., or any of the various glass fiber insulations, spun glass, etc., either wrapped around the member 10 or suitably held by a covering material such as a thin metal layer or canvas material.

The pipes, tanks, etc., depicted by wall member 10 are adapted to handle extremely low temperatures in the cryogenic range, or very hot temperatures of the order of, for example, 1,400° F. The member 10 may accordingly be formed of various metals, alloys thereof, ceramics, etc., capable of withstanding the extreme temperatures. A hole 14 is formed by removing a plug (not shown) of the insulating material 12, and may be of any desired shape, e.g., circular, rectangular, hexagonal, etc., thereby exposing a corresponding portion of the member 10. A removable, insulating plug 16 in accordance with the invention, is shown installed within the hole 14.

The removable insulating plug 16 of the invention contemplates the combination of; insulating plug means of selected insulating material (hereinafter referred to as a "biscuit" 18 to distinguish it from the member 10 insulation); heat dissipating cap means 20 selectibly secured to the insulating biscuit 18, and resilient handle means 22 associated with the cap means 20 and the biscuit 18, and adapted to retractably engage the sidewalls of the hole 14 in the insulation 12, to firmly secure the invention thereinto. Although a specific embodiment of the plug 16 is described herein by way of example only, it is to be understood that various modifications may be made thereto while still retaining the above basic invention combination, as further detailed below.

Thus the insulating biscuit 18 is formed of a suitable insulating material, capable of withstanding and shielding against the extreme temperatures found in the cryogenic systems, and/or high temperature systems of previous mention. Various refractory materials such as fire brick, as well as glass fiber insulating materials are available, wherein the more solid insulating materials can be formed in the shape of the biscuit 18, whereas a less consolidated material such as glass fiber etc. may be held within an enclosure of suitable shape.

The biscuit 18 has a shape and dimensions commensurate with the shape and dimensions of the hole 14. That is, the outside dimensions of the biscuit 18 are slightly smaller than the inside dimensions of the hole 14. Accordingly a narrow annular space 24 is provided between the biscuit 18 and the confronting surface of the hole 14. Likewise the biscuit thickness is selected to provide an air space 26 between it and the confronting surface of the member 10, while still retaining sufficient thickness of the biscuit to provide the required degree of insulation.

The outer circumferential edge of the biscuit 18 adjacent the cap 20, is beveled at a selected angle, as indicated by numeral 28, to allow the handle to clear the edge of the biscuit 18 and engage the cap 20, and to allow extending the outer circumference of the biscuit 18 towards the surrounding sidewalls of the hole 14, to thereby decrease the width of the annular space 24 as much as possible without interferring with the translatable action of the handle means 22, as further described infra.

A cap means (hereinafter referred to as cap 20), preferably a thin, flat disc of a material having good heat dissipating properties such as, for example, aluminum, etc., is connected to biscuit 18 and has an outside diameter or overall dimensions, substantially greater than the diameter, or overall dimensions, of the hole 14. Cap 20 is provided with a pair of diametrically opposed slots 30, formed as by a stamping operation, wherein the displaced material of each slot is depressed toward the beveled edge 28 of the biscuit circumference, to lie substantially parallel thereto at a selected distance therefrom to provide detents or lock tabs 32 integral with the slots 30.

A bolt 34 extends through the cap 20 and the biscuit 18, and these elements are secured together by a washer and nut 36 threaded to the bolt 34. Note that the biscuit 18 is provided with a recess 38 whereby the washer and nut 36 are countersunk to provide an air space between them and the confronting surface of the member 10. The bolt 34/nut 36 combination may be of metal or, in very high heat situations, may be formed of various ceramics or porcelains, or other high temperature resistant materials which can be shaped or molded to provide a fastener means.

Although the biscuit 18 is herein shown secured to the cap 20 via the bolt 34/nut 36 fastening means, it is to be understood that the two elements 18, 20 may be secured together as by means of any adhesive (not shown) capable of withstanding the extremely low or high temperatures. In a further embodiment tabs may be stamped from the cap 20 and bent downwardly into matching grooves or holes (not shown) in the biscuit 18, to secure the latter to the cap 20. When employing an unconsolidated insulating material such as glass fiber, a pre-formed enclosure means may be disposed about the insulating material with the enclosure means being secured to the cap 20.

The air space 26 provides some insulation between the wall member 10 and the confronting parts of the plug 16, e.g., the biscuit 18, and the bolt 34/nut 36, whereby a substantial amount of the heat radiated by the member 10 is blocked prior to reaching the plug 16. Note further that the cap 20 acts as a heat sink since it has good heat conducting or dissipating properties. Thus the cap 20 not only radiates the heat which is introduced by conduction from the member 10, but also the heat delivered by contact with the bolt 34.

As previously mentioned, various insulated wall member assemblies are provided with insulation 12 which, in turn, may have a thin cover of a metallic material such as aluminum, in order to protect the insulation 12. Since the heat dissipating cap 20 is in contact with this metal cover (not shown) along its outermost periphery, the cap 20 further tends to act as a heat conductor which conducts and thus dissipates the heat it receives from the member 10 into the metal cover of the insulating material 12.

The resilient handle means (hereinafter referred to as handle 22) is formed from a thin strip of a resilient material, preferably with poor heat conducting properties. The handle 22 is provided with end portions 41 of smaller width than that of a central portion 43, which end portions define pointed ends, as indicated at 40. Forming the narrower end portions 41 provides shoulders 42 between portions 41 and the central portion 43, which engage the cap 20 when the handle 22 is inserted through the slots 30, as when assembling the plug 16. Detents or lock tabs 44 are stamped in the end portions 41 of the handle 22, and protrude inwardly towards the center of the cap 20 and biscuit 18. Thus upon assembly, the lock tabs 44 of the handle means combine with the lock tabs 32 of the cap 20 to provide handle locking means that prevents withdrawing the handle 22 from its position within the slots 30.

FIG. 3 shows the plug 16 of the invention with the handle 22 retracted, as when the plug is removed from or replaced into the hole 14 in the insulating material 12. The fingers of one hand may be used to grasp the handle 22 at the center portion 43, while applying the remaining fingers against the cap 20, whereby the central portion of handle 22 is pulled away from the cap 20. This action causes the handle 22 to assume a more acutely arcuate, e.g., circular, condition whereby the end portions 41 of the handle 22 assume orientations which approach a parallel to the outer circumferential surface of the biscuit 18. The pointed ends 40 (and the end portions 41) are thereby withdrawn from the surrounding insulating material 12 and into the annular space 24. Thus the plug 16 may be repeatedly inserted into, or withdrawn from, the hole 14.

In use, in the situation where the plug 16 is to be inserted into the hole 14, the plug 16 is grasped by the fingers of one hand as previously described, whereby the handle 22 is pulled until the lock tabs 44 thereof engage the lock tabs 32 of the cap 20. The plug 16 may be then inserted into the which approach a parallel to the outer circumferential surface of the biscuit 18. The pointed ends 40 (and the end portions 41) are thereby withdrawn from the surrounding in sulfating material 12 and into the annular space 24. Thus the plug 16 may be repeatedly inserted into, the hole 14, and the periphery of the cap 20 is urged against the surface of the insulation 12, as is shown in FIG. 3. The handle 22 is then released, whereupon pressure against the handle 22 with the fingers or the palm of the hand, in conjunction with the tendency for the handle 22 to assume a straight position due to its resiliency, causes the handle to straighten whereby the pointed ends 40 are driven into the insulating material 12 as shown in FIG. 2. This secures the plug 16 firmly to the insulation 12. The resiliency of the handle means 22 prevents the plug 16 from being disclocated by vibrations, etc., until removal is desired. Note the penetration of the end portions 41 is limited by the shoulders 42 which engage the upper surface of the cap 20 in the region of the slots 30.

The combination of the air space 26, the insulating biscuit 18, and the heat dissipating cap means 20, thus provides for the dissipation of the heat which normally would radiate from the exposed surface of the wall member 10. The temperature of the cap 20 remains sufficiently low to allow personnel to touch it without undue discomfort. Likewise, the temperature of the handle 22 remains low enough to be grasped with the bare hand, even though the (exposed) surface of the wall member 10 may have a temperature of the order of 1,400° F.

Note that the locking means, viz, the lock tabs 32,32 and 44,44, may be rearranged other than shown, or may assume configurations other than that of the engaging tabs. For example, the lock tabs 32 of the cap may be bent sharply downward and out from the outer edge of the slots 30, and the lock tabs 44 of the handle may be bent outwardly and up to engage respective tabs 32. On the other hand, either pair of lock tabs 32 or 44 may be replaced by other means which would engage the remaining lock tabs. For example, blocks of material may be secured to the handle 22 in place of tabs 44, which blocks would bear against the confronting edges of the tabs 32 when the end portions 41 are retracted, to prevent withdrawing the handle 22 from the slots 30. Thus various configurations are possible for the handle locking means.

In addition the handle 22 may include more than a pair of end portions 41, e.g., it may have 3, 4, etc., end portions extending from a central portion, wherein all the respective pointed ends would extend into the surrounding insulating material to secure the plug 16. A hole in the central portion would allow insertion of a finger whereby the handle could be retracted.

On the other hand, the resilient handle 22 may employ a single end portion 41, translatably disposed through a single slot 30, and resiliently welded or hinged at its other end to the cap 20. In this embodiment (not shown) a radially protruding portion of the cap 20 extends downwardly therefrom diametrically opposite the end portion 41, to engage the surrounding insulating material 12 at that side of the plug 16.

Although the plug 16, described herein by way of example only, utilizes a single handle 22 and replugs a relatively small hole 14, the combination may be utilized to plug a relatively large hole of, for example, several inches long and a few inches wide, by employing a correspondingly larger "biscuit" of insulating material and associated cap. A pair of handles are disposed in the cap, in spaced apart parallel relation within two pairs of respective slots in the cap. The pointed ends of each handle extend outwardly from under the (longer) lateral edges of the corresponding cap means. A plug of such larger dimensions may require a hinge disposed transverse to its longer length at the midpoint thereof, whereby the insulating plug may hinge slightly to provide a better fit against a curved wall member.

What is claimed is:

1. A removable insulation plug for replugging a hole formed in an insulating material layer disposed about a preinsulated member, comprising the combination of;
   insulator plug means formed of a selected insulating material and having dimensions commensurate with the dimensions of the hole formed in the insulating material of the preinsulated member;
   fastener means including resilient handle means translatably secured to the insulator plug means;
   said resilient handle means including at least one locking portion thereof extending radially outwardly beyond the periphery of said plug.

2. The insulating plug of claim 1 further including a cap of heat dissipating material integral with the insulator plug means, said cap having an outer periphery which extends beyond the periphery of the insulator plug means, said cap further having an opening therein for receiving therethrough the extendable portion of the resilient handle means.

3. The insulating plug of claim 2 wherein the cap is secured to one flat surface of the insulator plug means and includes a plurality of spaced slots, and said resilient handle means includes a plurality of extendable portions translatably disposed through said respective slots.

4. The insulating plug of claim 3 wherein the resilient handle means further includes a strip of resilient material having end portions thereof translatably disposed through said plurality of slots to define said extendable portions, the end portions of said extendable portions protruding outwardly and downwardly beyond the periphery of said plug.

5. The insulating plug of claim 4 further including locking means integral with the resilient handle means and also the cap, and engageable when the end portions of the handle means are retracted from the surrounding insulating material layer to prevent withdrawing the handle means from the cap.

6. The insulating plug of claim 5 wherein the thickness of the insulator plug means is substantially less than the thickness of the surrounding insulating material layer to provide an air space between the confronting surfaces of the insulator plug means and the preinsulated member.

7. The insulating plug of claim 5 wherein the relative dimensions of the insulator plug means and the hole formed in the insulating material provide an annular space therebetween of sufficient width to receive the end portions of the handle means therein upon their retraction from the surrounding insulating material layer.

8. The insulator plug of claim 1 wherein at least one portion of said handle extends outwardly and downwardly beyond the periphery of said insulator plug and into the insulation surrounding said hole when said plug is in place on said preinsulated member.

9. A fastener means for removably securing an insulator plug within a hole defined by a surrounding layer of insulating material disposed upon a preinsulated member comprising a resilient handle translatably secured to said insulator plug, and at least one extended portion affixed to said resilient handle and extending radially outwardly and downwardly beyond the periphery of said plug and into engagement within said insulating material layer when said plug is positioned in said hole.

* * * * *

UNITED STATES PATENT OFFICE
CERTIFICATE OF CORRECTION

Patent No. 3,658,096          Dated April 25, 1972

Inventor(s) ROBERT E. HIGUERA

It is certified that error appears in the above-identified patent and that said Letters Patent are hereby corrected as shown below:

In DESCRIPTION OF THE PREFERRED EMBODIMENTS, Column 4,

Line 32 to Line 37 incl.     after "inserted into the"

delete: "which approach a parallel to the outer circumferential surface of the biscuit 18. The pointed ends 40 (and the end portions 41) are thereby withdrawn from the surrounding in sulfating material 12 and into the annular space 24. Thus the plus 16 may be repeatedly inserted into, the"

Signed and sealed this 26th day of September 1972.

(SEAL)
Attest:

EDWARD M. FLETCHER, JR.
Attesting Officer

ROBERT GOTTSCHALK
Commissioner of Patents